April 18, 1961     J. O. JOHNSON, JR., ET AL     2,979,953
AMBIENT TEMPERATURE COMPENSATING MEANS
FOR CAPILLARY TUBING
Filed Oct. 26, 1956
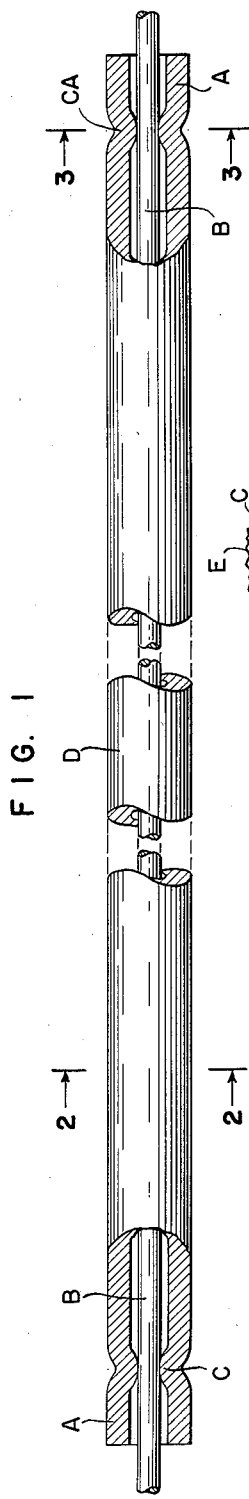
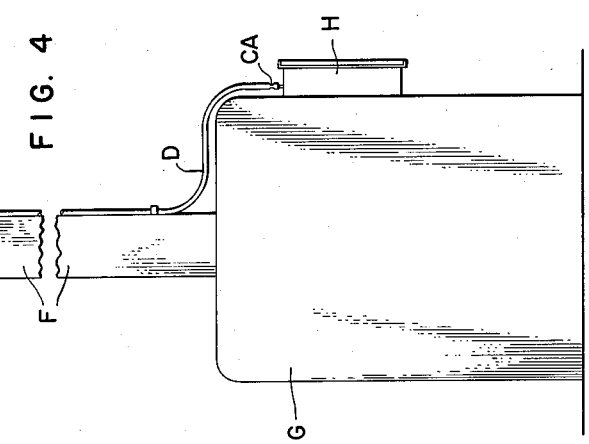
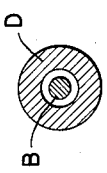
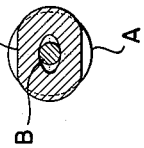
INVENTORS.
JUSTIN O. JOHNSON JR.
KONRAD H. STOKES
BY
ATTORNEY.

Patented Apr. 18, 1961

2,979,953

AMBIENT TEMPERATURE COMPENSATING MEANS FOR CAPILLARY TUBING

Justin O. Johnson, Jr., Philadelphia, and Konrad H. Stokes, Ambler, Pa., assignors to Minneapolis-Honeywell Regulator Company, Minneapolis, Minn., a corporation of Delaware Filed Oct. 26, 1956, Ser. No. 618,461

8 Claims. (Cl. 73—368.4)

The general object of the present invention is to provide an improved temperature compensating means for eliminating errors due to the expansion of the temperature sensitive fill used in a fixed capillary.

Another object of the invention is to provide an ambient temperature compensating means for a capillary consisting of a single long length of capillary tubing as distinguished from known capillary tubing that is constructed by welding a plurality of short lengths of capillaries together.

Another object of the present invention is to provide an improved temperature compensating means for a capillary which compensating means is comprised of a single metal wire having a low coefficient of expansion and its extreme ends held in tension by crimps made in the capillary.

If a capillary tube having ordinary temperature coefficients of cubical expansion contains a wire of very low coefficient such as Invar, the tube inside diameter and the wire outside diameters having just the right ratio, then the temperature coefficient of volume expansion of the unfilled space can be made to match the coefficient of cubical expansion of fluid fill. Then, when incorporated in a fluid filled thermometer system, temperature changes along the capillary will not introduce errors in the indication of the instrument.

A still more specific object of the invention is to provide a crimping means for maintaining a metal wire in a tensioned condition in a capillary tube so that the aforementioned preestablished relationship between the capillary tube and Invar wire will be retained and thus prevent friction drag errors due to binding between the inner wall of the capillary and the wire when the capillary is required to be used in a bent condition.

A still more specific object of the invention is to provide a tensioned Invar wire within a capillary which will prevent errors due to buckling of the Invar against the capillary when the temperature that surrounds one portion of the capillary differs from the temperature that surrounds another portion of this capillary. In other words, it is the object of this invention to prevent errors due to a buckling Invar wire from changing the aforementioned preestablished relationship between the capillary tube and Invar wire.

It should be understood that the maximum amount of force that is applied to the Invar wire to place the rod in tension is never of such a magnitude that the elastic limit of the wire is exceeded. In other words, it is another specific object of the present invention to provide an ambient temperature compensating means for a capillary tube in the form of a tensioned wire whose molecular structure will remain in such an elastic state that it will always possess the tendency to be returned to its untensioned position.

In a preferred embodiment of the invention an elongated Invar wire of substantially greater length than the diameter, is surrounded by a metallic capillary tube having a body portion ordinarily of a small diameter though slightly larger in internal diameter than the external diameter of the Invar wire. The end portions of the Invar wire are tensioned and clamped or otherwise secured in this tensioned position between flattened end portions of the tube. The bulged end of this clamp also contains a passageway to permit the fluid fill to readily flow between the portions of the Invar wire that are clamped and the inner wall of the capillary.

A better understanding of the present invention may be had from the following detailed description which reads in connection with the accompanying drawing in which:

Fig. 1 is a transverse section through a capillary tube that surrounds and is clamped to a tensioned Invar wire;

Fig. 2 is a cross section at 2—2 through a portion of the tube intermediate its crimped ends;

Fig. 3 is a section on the line 3—3 extending through the crimped end portion of the tube; and Fig. 4 is a typical application in which the capillary shown in Fig. 1 is used to advantage to measure the temperature of a flue gas.

In the accompanying drawing, a capillary tube A of substantially greater length than diameter, and surrounding a pretensioned Invar wire B, has crimped end portions C and CA adjacent its opposite ends. As shown, the average internal diameter of the tube A is slightly greater than the external diameter of the Invar wire B. The wire B extends centrally through the tube A and is elongated so that the ends of the wire B extend outward away from the ends of the tube A. The crimped end portions C and CA of the tube A are advantageously flattened as shown in Figs. 1 and 3, so that said end portions will each have two parallel flattened sides in gripping contact with its associated end portion of the Invar wire B, as is clearly shown in Fig. 3. The crimped portions C and CA shown in Fig. 1 have parallel sides in gripping contact with the adjacent sides of the tensioned wire B. As will be apparent, the distance between the crimped end portions C and CA or in other words the central portion D of the tube A shown in Fig. 1 is shown broken to indicate that there is a substantial length between these crimps which ofttimes is in excess of one hundred feet.

When a rod is placed in tension by applying a force along its longitudinal axis it will cause an applied tensile stress $S_A$ to be set up within the rod which stress will be acting in the same direction as the applied force. According to Poisson's ratio, an induced stress component $\mu S_A$ is also concurrently introduced within the rod whose direction is in a plane that is normal to the plane in which the applied stress is acting and whose magnitude is proportional but not as large as the applied tensile stress.

The elongation of the rod $e_L$ resulting from the applied tensile stress is:

$$e_L = \frac{\text{Applied stress in \#/sq. in.} \times L^{\text{th}}}{\text{Young's modulus in \#/in.}^2 \times 10^6} = \frac{S_A L}{E}$$

The elongation of the rod $e_T$ resulting from the induced tensile stress is:

$$e_T = \frac{\text{P. ratio} \times \text{induced stress in \#/sq. in.} \times \text{dia. of rod}}{\text{Young's mod. in \#/in.}^2 \times 10^6} = \frac{\mu S_A d}{E}$$

The initial volume of the untensioned rod is:

$$V_0 = \frac{\pi}{4} (\text{dia. rod})^2 \times \text{length of rod to be tensioned} = \frac{\pi}{4} d^2 L$$

The final volume after rod is tensioned is:

$$V_f = \frac{\pi}{4}\left(\begin{array}{l}\text{unstretched}\\ \text{dia. rod}\end{array} - \begin{array}{l}\text{elongation due to induced}\\ \text{tensile stress}\end{array}\right)^2 \left(\begin{array}{l}\text{unstretched elongation}\\ \text{due to length of rod}\end{array}\right.$$

$$\left.+\text{applied tensile stress}\right)$$

$$V_f = \frac{\pi}{4}(d - e_t)^2 (1 + el)$$

Substituting for $e_t$ and $e_1$ and reducing to a linear form. Therefore the total change in volume of the rod $V_f$ in going from an untensioned position to a tensioned position is:

$$V_f = \begin{array}{l}\text{Initial vol. of}\\ \text{untensioned rod}\end{array}\left\{1\right.$$

$$\left.+\left[(1-2\text{ Poisson's ratio})\frac{\text{Applied stress}}{\text{mod. of elasticity}}\right]\right\}$$

$$V_f = V_o\left[1 + (1-2\mu)\frac{SA}{E}\right]$$

$V_f =$ a constant [1 + A positive value]

$V_f =$ a value greater than $V_o$

The present invention recognizes that such increase in volume must be considered in eliminating errors due to the expansion of the temperature sensitive fill used in fixed capillaries. To this end the present invention further suggests retaining a tensioned wire in a capillary tube by crimping the tube to each end of an Invar wire that is within and adjacent to the end of the tube. In this way whenever an increase in the temperature of the atmosphere that surrounds the tube occurs and the tube is expanding additional tension will be placed on the wire. This additional tension will cause the volume of the wire between the clamped ends of the tube to increase along with the capillary tube. This volume change in the wire plus the small wire volume change due to the natural thermal expansion of the wire material subtracted from the volume change of the capillary volume will always equal the desired cubical expansion of the fluid fill previously referred to in column 1, lines 31 to 40, of this specification.

The self-compensating capillary tube A operates by virtue of the differential expansion between said tube and the Invar wire, due to the ambient temperature surrounding the tube B in such a manner that the volume increase allotted to mercury in the capillary tube may remain linear and reproduceable with changes in ambient temperature. When the wire is used in this single continuous long length manner, there is a difference in operation accordingly as the wire is taut or slack. Thus, if, as in the case at bar, the wire is made sufficiently taut with sufficient force to ensure that it will remain taut under all conditions of ambient temperature, the compensation will always be constant and predictable for any system in any installation even if the capillary is bent in the manner shown in Fig. 4 of the drawing. More specifically, it is to be noted that with the arrangement shown in Figs. 1, 2, and 3, the portions of the wire between the compressed sections C and CA will remain taut under all normal ambient conditions, so that the space compensation for mercury or analogous fluid will always be constant and predictable for the associated system or installation. As is clearly shown in Fig. 3, the crimped end portions C, CA do not close, but flatten and transversely enlarge the portions of the tube space extending through the sections C and CA.

Fig. 4 of the drawing shows how the type of capillary A shown in Fig. 1 can be used to advantage with a bulb E to sense and accurately transmit changes in the temperature of a gas, that is being sent up a flue pipe F by a furnace G, to a temperature recording instrument H.

One of the advantages gained by the type of capillary shown in this Fig. 4 application over systems in which the inner wire is not tensioned is that such a tensioned wire does not tend to buckle and stick to the inside wall of the capillary tube when the capillary is bent in the manner, e.g., as shown at the upper and lower end portions of the capillary in Fig. 4. When non-tensioned Invar wires are used in the application shown in Fig. 4, wherein the ambient temperature of the lower portion of the capillary is greater than the upper portion a buckling or hanging up action of such a wire against the inner wall of the capillary will occur. This action takes place as portions of the wire in the bent part of the capillary will be caused to cling to the side of the capillary wall while hardly any capillary wall clinging is taking place at portions of the wire in the straight part of the capillary.

Such a condition will thus have an adverse effect on the previously mentioned preestablished relationship that exists between the inside diameter of the capillary tube and the outside diameter of the Invar wire and this in turn will prevent the temperature coefficient of volume expansion of the unfilled capillary space from matching the cubical expansion of the mercury. Such non-tensioned wires would thus tend to introduce ambient temperature errors in the capillary line which would prevent accurate transmission of flue gas temperature changes to the temperature recording instrument.

As previously stated, one of the primary objects of the present invention is to provide a tensioned Invar wire within a capillary that will always retain the aforementioned preestablished relationship between the capillary tube and wire (even when portions of the capillary are used in a bent condition), so that the capillary may under all conditions of use be able to accurately transmit changes in temperature that are being sensed by a bulb to a temperature recording instrument.

What is claimed is:

1. An ambient temperature compensating means for retaining the volume expansion of the space between the inside wall of a metallic capillary tube having one coefficient of expansion and the outside wall of an elongated tensioned wire of a lower coefficient of expansion within said tube equal to the cubical expansion of a fluid fill within said space between said two walls comprising, a clamping means at each end of said tube to retain said tensioned wire in a taut condition.

2. An ambient temperature compensating means for retaining the volume change of the space between the inside wall of a metallic capillary tube having a high coefficient of expansion and the outside wall of an elongated tensioned wire of low coefficient of expansion within said tube equal to the volume change of a fluid fill within said space between said two walls comprising, a clamping means at each end of said tube to retain said tensioned wire in a taut condition.

3. An ambient temperature compensating means for retaining the volume change of the space between the inside wall of a metallic capillary tube having one coefficient of expansion and the outside wall of an elongated tensioned wire of lower coefficient of expansion within said tube equal to the volume change of a fluid fill within said space between said two walls comprising a clamping means at each end of said tube to retain said tensioned wire in a taut condition.

4. In a fluid-filled thermal system, an ambient temperature compensated metallic capillary tube structure comprising an elongated tubular element having a predetermined temperature coefficient of expansion, a tensioned wire having a temperature coefficient of expansion lower than that of said tubular element and having a smaller diameter than said element and extending therethrough, said tubular element having end portions to engage opposite side portions of the ends of said wire to retain the wire under tension whereby a change in ambient temperature will tend to result in expansion of said tubular element and a corresponding increase in the volume of the annular space between said element and wire upon an increase in ambient temperature, contraction of said tubular element and a corresponding decrease in the volume of said annular space upon a decrease in ambient temperature, said tubular element simultaneously effecting an increase or decrease, respectively, in the tension on said wire to cause a corresponding volume expansion or contraction, respectively, of said wire within said tubular element to occur, a fluid fill within the annular space between said tubular element and said wire, said volume change taking place within the confines of the tubular element being equal to the volume change occurring in said fluid fill due to said change in ambient temperature.

5. An ambient temperature compensating capillary tube structure comprising an elongated tubular element having a predetermined temperature coefficient of expansion surrounding an elongated tensioned wire having a temperature coefficient of expansion lower than that of said tubular element, said wire being smaller in diameter than the average diameter of said element, means clamping spaced apart end portions of said wire in engagement with end portions of said tubular element to retain the wire in a tensioned position whereby a change in ambient temperature will result in a change in the volume of the space within the confines of said tubular element while said tubular element simultaneously alters the tension it is applying to said wire and wherein said change in tension in said wire will simultaneously cause a volume change in said wire within said tubular element to occur, a fluid fill within said tubular element surrounding said wire and said volume change taking place within the confines of the tubular element being equal to the volume change occurring in said fluid fill due to said change in ambient temperature.

6. In a fluid-filled thermal system, a self-compensating metallic capillary tube structure comprising an elongated partially bent tubular element having a predetermined temperature coefficient of expansion, a tensioned wire having a temperature coefficient of expansion lower than that of said bent tubular element, said wire being of a smaller diameter than said element and extending therethrough, said tubular element having end portions to engage and bear against opposite side portions of the ends of said wire to retain the wire in said tensioned position whereby a change in ambient temperature will result in a change in the volume of the space within the confines of said bent tubular element while said tubular element simultaneously alters the tension it is applying to said wire and wherein said change in tension in said wire will simultaneously cause a volume change in said wire within said bent tubular element to occur, a fluid fill within said tubular element surrounding said wire and said volume change taking place within the confines of said tubular element being equal to the volume expansion occurring in said fluid fill due to said change in ambient temperature.

7. A self-compensating metallic capillary tube structure, comprising an elongated tubular portion having a predetermined temperature coefficient of expansion and including a bent portion, a tensioned wire having a temperature coefficient of expansion lower than that of said tubular portion spaced inwardly from the inner wall of said tubular portion and extending centrally therethrough, said tubular portion having two crimped portions to engage elongated end portions of said tensioned wire, whereby a change in ambient temperature will result in a change in the volume of the space within the confines of said tubular portion while said tubular portion simultaneously alters the tension it is applying to said wire and wherein said change in tension in said wire will simultaneously cause a volume change in said wire within said tubular portion to occur, a fluid fill within said tubular portion surrounding said wire and said volume change taking place within the confines of the tubular portion being equal to the volume change occurring in said fluid fill due to said change in ambient temperature.

8. An elongated tubular element having a predetermined temperature coefficient of expansion surrounding an elongated tensioned wire having a temperature coefficient of expansion lower than that of said tubular element, said tensioned wire being of smaller diameter than the average diameter of said element, said portion of said tubular element between said end portions of said last-mentioned element being of a bent configuration, means for clamping end portions of said tubular element to the outer wall of said wire to cause movement therewith upon a change in ambient temperature, whereby said change in ambient temperature will result in a change in the volume of the space within the confines of said tubular element while said tubular element simultaneously alters the tension it is applying to said wire and wherein said change in tension in said wire will simultaneously cause a volume change in said wire within said tubular element to occur, a fluid fill within said tubular element surrounding said wire and said volume change taking place within the confines of the tubular element being equal to the volume change occurring in said fluid fill due to said change in ambient temperature.

References Cited in the file of this patent

UNITED STATES PATENTS

| | | |
|---|---|---|
| 1,889,792 | Rosenburgh | Dec. 6, 1932 |
| 2,037,949 | Tate | Apr. 21, 1936 |
| 2,350,343 | Fischer | June 6, 1944 |

OTHER REFERENCES

Brady: abstract of application Serial Number 245,622 published September 29, 1953, O. G. Class 73—368.